US009760882B2

(12) United States Patent
Myers et al.

(10) Patent No.: US 9,760,882 B2
(45) Date of Patent: Sep. 12, 2017

(54) WIRELESS PAYMENT METHOD AND SYSTEMS

(75) Inventors: Joan Myers, Danville, CA (US); Sara Garrison, Orinda, CA (US); Mark Carlson, Half Moon Bay, CA (US)

(73) Assignee: VISA U.S.A. INC., San Francisco, CA (US)

( * ) Notice: Subject to any disclaimer, the term of this patent is extended or adjusted under 35 U.S.C. 154(b) by 307 days.

(21) Appl. No.: 12/263,320

(22) Filed: Oct. 31, 2008

(65) Prior Publication Data

US 2009/0055277 A1 Feb. 26, 2009

Related U.S. Application Data

(63) Continuation of application No. 11/877,880, filed on Oct. 24, 2007, now abandoned, which is a
(Continued)

(51) Int. Cl.
*G06Q 20/32* (2012.01)
*G06Q 20/02* (2012.01)
(Continued)

(52) U.S. Cl.
CPC ......... *G06Q 20/322* (2013.01); *G06Q 20/027* (2013.01); *G06Q 20/085* (2013.01);
(Continued)

(58) Field of Classification Search
CPC .... G06Q 20/322; G06Q 20/027; G06Q 20/10; G06Q 20/102; G06Q 20/20;
(Continued)

(56) References Cited

U.S. PATENT DOCUMENTS 4,613,904 A 9/1986 Lurie
4,674,041 A 6/1987 Lemon et al.
(Continued)

FOREIGN PATENT DOCUMENTS

DE 100 07 518 A1 8/2001
EP 1 109 138 A2 6/2001
(Continued)

OTHER PUBLICATIONS

Abad-Peiro, J.L. et al.; "Research Report: Designing a Generic Payment Service"; 1996, *IBM Research Division*, 24 pages.
(Continued)

*Primary Examiner* — H Rojas
(74) *Attorney, Agent, or Firm* — Kilpatrick Townsend & Stockton LLP

(57) ABSTRACT

A method for conducting a transaction is disclosed. The method includes using a first portable electronic device, and directly transmitting a request for payment to a second portable electronic device through a wireless link. Then, the second portable electronic device transmits an approval of the request for payment to the first portable electronic device. One of the first and the second portable electronic devices then sends the request for payment to a payment hub service. The payment hub service then facilitates the transfer of funds from a payer institution to a payee institution to complete the transaction.

19 Claims, 3 Drawing Sheets

Related U.S. Application Data continuation of application No. 11/519,276, filed on Sep. 11, 2006, now Pat. No. 7,407,094, which is a continuation of application No. 11/040,640, filed on Jan. 21, 2005, now Pat. No. 7,124,937.

(51) Int. Cl.

| | | |
|---|---|---|
| *G06Q 20/10* | (2012.01) | |
| *G06Q 20/20* | (2012.01) | |
| *G06Q 20/08* | (2012.01) | |
| *G06Q 20/40* | (2012.01) | |
| *G06Q 30/06* | (2012.01) | |
| *G06Q 40/00* | (2012.01) | |
| *G06Q 20/38* | (2012.01) | |
| *G06Q 40/02* | (2012.01) | |

(52) U.S. Cl.
CPC ........... *G06Q 20/10* (2013.01); *G06Q 20/102* (2013.01); *G06Q 20/20* (2013.01); *G06Q 20/3821* (2013.01); *G06Q 20/40* (2013.01); *G06Q 30/06* (2013.01); *G06Q 40/00* (2013.01); *G06Q 40/02* (2013.01)

(58) Field of Classification Search
CPC ...... G06Q 20/085; G06Q 20/40; G06Q 30/06; G06Q 40/00; G06Q 40/02; G06Q 20/3821
See application file for complete search history.

(56) References Cited

U.S. PATENT DOCUMENTS

| | | |
|---|---|---|
| 5,305,196 A | 4/1994 | Deaton et al. |
| 5,327,508 A | 7/1994 | Deaton et al. |
| 5,353,218 A | 10/1994 | DeLapa et al. |
| 5,388,165 A | 2/1995 | Deaton et al. |
| 5,393,965 A | 2/1995 | Bravman et al. |
| RE34,915 E | 4/1995 | Nichtberger et al. |
| 5,420,606 A | 5/1995 | Begum et al. |
| 5,430,644 A | 7/1995 | Deaton et al. |
| 5,448,471 A | 9/1995 | Deaton et al. |
| 5,483,444 A | 1/1996 | Heintzeman et al. |
| 5,502,636 A | 3/1996 | Clarke |
| 5,564,073 A | 10/1996 | Takahisa |
| 5,577,266 A | 11/1996 | Takahisa et al. |
| 5,579,537 A | 11/1996 | Takahisa |
| 5,592,560 A | 1/1997 | Deaton et al. |
| 5,595,264 A | 1/1997 | Trotta, Jr. |
| 5,604,921 A | 2/1997 | Alanara |
| 5,608,874 A | 3/1997 | Ogawa et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,469 A | 8/1997 | Deaton et al. |
| 5,675,662 A | 10/1997 | Deaton et al. |
| 5,687,322 A | 11/1997 | Deaton et al. |
| 5,710,886 A | 1/1998 | Christensen et al. |
| 5,717,866 A | 2/1998 | Naftzger |
| 5,761,648 A | 6/1998 | Golden et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,855,007 A | 12/1998 | Jovicic et al. |
| 5,870,030 A | 2/1999 | DeLuca et al. |
| 5,878,337 A | 3/1999 | Joao et al. |
| 5,884,277 A | 3/1999 | Khosla |
| 5,905,246 A | 5/1999 | Fajkowski |
| 5,907,830 A | 5/1999 | Engel et al. |
| 5,917,913 A | 6/1999 | Wang |
| 5,920,847 A | 7/1999 | Kolling |
| 5,924,080 A | 7/1999 | Johnson |
| 5,959,577 A | 9/1999 | Fan et al. |
| 5,974,399 A | 10/1999 | Giuliani et al. |
| 5,979,757 A | 11/1999 | Tracy et al. |
| 5,982,891 A | 11/1999 | Ginter et al. |
| 5,991,749 A | 11/1999 | Morrill, Jr. |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,018,718 A | 1/2000 | Walker et al. |
| 6,035,280 A | 3/2000 | Christensen |
| 6,041,309 A | 3/2000 | Laor |
| 6,049,778 A | 4/2000 | Walker et al. |
| 6,062,991 A | 5/2000 | Moriarty et al. |
| 6,067,526 A | 5/2000 | Powell |
| 6,067,529 A | 5/2000 | Ray et al. |
| 6,076,068 A | 6/2000 | DeLapa et al. |
| 6,076,069 A | 6/2000 | Laor |
| 6,076,101 A | 6/2000 | Kamakura et al. |
| 6,098,053 A | 8/2000 | Slater |
| 6,128,599 A | 10/2000 | Walker et al. |
| 6,175,922 B1 | 1/2001 | Wang |
| 6,185,541 B1 | 2/2001 | Scroggie et al. |
| 6,189,787 B1 | 2/2001 | Dorf |
| 6,237,145 B1 | 5/2001 | Narasimhan et al. |
| 6,279,112 B1 | 8/2001 | O'Toole, Jr. et al. |
| 6,292,786 B1 | 9/2001 | Deaton et al. |
| 6,307,958 B1 | 10/2001 | Deaton et al. |
| 6,318,631 B1 | 11/2001 | Halperin |
| 6,321,208 B1 | 11/2001 | Barnett et al. |
| 6,330,543 B1 | 12/2001 | Kepecs |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,351,735 B1 | 2/2002 | Deaton et al. |
| 6,366,893 B2 | 4/2002 | Hannula et al. |
| 6,377,935 B1 | 4/2002 | Deaton et al. |
| 6,386,451 B1 | 5/2002 | Sehr |
| 6,424,949 B1 | 7/2002 | Deaton et al. |
| 6,424,951 B1 | 7/2002 | Shurling et al. |
| 6,434,534 B1 | 8/2002 | Walker et al. |
| 6,438,527 B1 | 8/2002 | Powar |
| 6,464,139 B1 | 10/2002 | Wilz et al. |
| 6,470,181 B1 | 10/2002 | Maxwell |
| 6,473,739 B1 | 10/2002 | Showghi et al. |
| 6,484,146 B2 | 11/2002 | Day et al. |
| 6,490,443 B1 | 12/2002 | Freeny, Jr. |
| 6,493,676 B1 | 12/2002 | Levy |
| 6,505,046 B1 | 1/2003 | Baker |
| 6,516,302 B1 | 2/2003 | Deaton et al. |
| 6,560,581 B1 | 5/2003 | Fox et al. |
| 6,587,835 B1 | 7/2003 | Treyz et al. |
| 6,601,759 B2 | 8/2003 | Fife et al. |
| 6,609,104 B1 | 8/2003 | Deaton et al. |
| 6,611,811 B1 | 8/2003 | Deaton et al. |
| 6,647,256 B1 | 11/2003 | Stewen et al. |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,697,944 B1 * | 2/2004 | Jones et al. .................. 713/168 |
| 6,726,092 B2 | 4/2004 | Goldberg et al. |
| 6,736,322 B2 | 5/2004 | Gobburu et al. |
| 6,775,539 B2 | 8/2004 | Deshpande |
| 6,784,874 B1 | 8/2004 | Shimizu |
| 6,816,724 B1 | 11/2004 | Asikainen |
| 6,837,425 B2 | 1/2005 | Gauthier et al. |
| 6,868,391 B1 | 3/2005 | Hultgren |
| 6,873,970 B2 | 3/2005 | Showghi et al. |
| 6,888,443 B2 | 5/2005 | Ritter |
| 6,912,398 B1 | 6/2005 | Domnitz |
| 6,913,191 B2 | 7/2005 | Goldberg et al. |
| 6,925,565 B2 | 8/2005 | Black |
| 6,934,689 B1 * | 8/2005 | Ritter et al. .................. 705/17 |
| 6,988,657 B1 | 1/2006 | Singer et al. |
| 7,003,495 B1 | 2/2006 | Burger et al. |

(56) References Cited

U.S. PATENT DOCUMENTS

| | | |
|---|---|---|
| 7,013,286 B1 | 3/2006 | Aggarwal et al. |
| 7,014,107 B2 | 3/2006 | Singer et al. |
| 7,025,256 B1 | 4/2006 | Drummond et al. |
| 7,028,008 B2 | 4/2006 | Powar |
| 7,028,906 B2 | 4/2006 | Challa et al. |
| 7,039,022 B1 | 5/2006 | Hedeas |
| 7,039,440 B2 | 5/2006 | Rodriguez et al. |
| 7,040,533 B1 | 5/2006 | Ramachandran |
| 7,051,923 B2 | 5/2006 | Nguyen et al. |
| 7,055,031 B2 | 5/2006 | Platt |
| 7,080,037 B2 | 7/2006 | Burger et al. |
| 7,085,556 B2 | 8/2006 | Offer |
| 7,089,214 B2 | 8/2006 | Wang |
| 7,096,003 B2 | 8/2006 | Joao et al. |
| 7,124,937 B2 | 10/2006 | Myers et al. |
| 7,131,578 B2 | 11/2006 | Paschini et al. |
| 7,133,659 B2 | 11/2006 | Zalewski et al. |
| 7,150,393 B1 | 12/2006 | Drummond et al. |
| 7,201,313 B1 | 4/2007 | Ramachandran |
| 7,207,477 B1 | 4/2007 | Ramachandran |
| 7,280,981 B2 | 10/2007 | Huang et al. |
| 7,315,823 B2 | 1/2008 | Brondrup |
| 7,349,871 B2 | 3/2008 | Labrou et al. |
| 7,376,587 B1 | 5/2008 | Neofytides et al. |
| 7,386,491 B2 | 6/2008 | Ashizaki et al. |
| 8,205,794 B2 | 6/2012 | Myers |
| 2002/0052193 A1 | 5/2002 | Chetty |
| 2002/0052841 A1 | 5/2002 | Guthrie et al. |
| 2002/0062281 A1 | 5/2002 | Singhal |
| 2002/0069165 A1 | 6/2002 | O'Neil |
| 2002/0073046 A1 | 6/2002 | David |
| 2002/0091569 A1 | 7/2002 | Kitaura et al. |
| 2002/0128928 A1 | 9/2002 | Sukegawa |
| 2002/0147913 A1 | 10/2002 | Lun Yip |
| 2002/0152123 A1 | 10/2002 | Giordano et al. |
| 2002/0152178 A1 | 10/2002 | Lee |
| 2002/0161704 A1 | 10/2002 | Powar |
| 2002/0165775 A1 | 11/2002 | Tagseth et al. |
| 2002/0178112 A1 | 11/2002 | Goeller et al. |
| 2002/0194137 A1 | 12/2002 | Park |
| 2002/0198777 A1 | 12/2002 | Yuasa |
| 2003/0004876 A1 | 1/2003 | Jacobson |
| 2003/0055792 A1 | 3/2003 | Kinoshita et al. |
| 2003/0058261 A1 | 3/2003 | Challa et al. |
| 2003/0078844 A1 | 4/2003 | Takatori et al. |
| 2003/0089767 A1 | 5/2003 | Kiyomatsu |
| 2003/0101134 A1 | 5/2003 | Liu et al. |
| 2003/0120593 A1 | 6/2003 | Bansal et al. |
| 2003/0126076 A1 | 7/2003 | Kwok et al. |
| 2003/0144907 A1 | 7/2003 | Cohen et al. |
| 2003/0191945 A1 | 10/2003 | Keech |
| 2003/0200184 A1 | 10/2003 | Dominguez et al. |
| 2003/0212595 A1 | 11/2003 | Antonucci |
| 2004/0004117 A1 | 1/2004 | Suzuki |
| 2004/0019564 A1 | 1/2004 | Goldthwaite et al. |
| 2004/0030601 A1 | 2/2004 | Pond et al. |
| 2004/0044621 A1 | 3/2004 | Huang et al. |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054591 A1 | 3/2004 | Spaeth et al. |
| 2004/0103063 A1 | 5/2004 | Takayama et al. |
| 2004/0107170 A1 | 6/2004 | Labrou et al. |
| 2004/0117254 A1 | 6/2004 | Nemirofsky et al. |
| 2004/0122685 A1 | 6/2004 | Bunce |
| 2004/0148224 A1 | 7/2004 | Gauthier et al. |
| 2004/0148254 A1 | 7/2004 | Hauser |
| 2004/0167820 A1 | 8/2004 | Melick et al. |
| 2004/0199474 A1* | 10/2004 | Ritter ............... G06Q 20/00 705/65 |
| 2004/0243517 A1 | 12/2004 | Hansen |
| 2004/0254848 A1 | 12/2004 | Golan et al. |
| 2004/0267663 A1 | 12/2004 | Karns et al. |
| 2005/0017068 A1 | 1/2005 | Zalewski et al. |
| 2005/0027543 A1 | 2/2005 | Labrou et al. |
| 2005/0036611 A1 | 2/2005 | Seaton et al. |
| 2005/0045718 A1 | 3/2005 | Bortolin |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0121506 A1 | 6/2005 | Gauthier et al. |
| 2005/0149439 A1 | 7/2005 | Suisa |
| 2005/0149455 A1 | 7/2005 | Bruesewitz et al. |
| 2005/0154877 A1 | 7/2005 | Trench |
| 2006/0004658 A1 | 1/2006 | Chau et al. |
| 2006/0074768 A1 | 4/2006 | Horton |
| 2006/0080243 A1 | 4/2006 | Kemper et al. |
| 2006/0085260 A1 | 4/2006 | Yamagishi |
| 2006/0085848 A1* | 4/2006 | Aissi et al. ............... 726/9 |
| 2006/0111967 A1 | 5/2006 | Forbes |
| 2007/0001001 A1 | 1/2007 | Myers |
| 2007/0124211 A1 | 5/2007 | Smith |
| 2007/0203833 A1* | 8/2007 | Huang ............... G06Q 20/02 705/40 |
| 2008/0255890 A1 | 10/2008 | Hilliard |
| 2015/0032634 A1* | 1/2015 | D'Agostino ....... G06Q 20/3829 705/71 |
| 2016/0012407 A1 | 1/2016 | Myers |

FOREIGN PATENT DOCUMENTS

| | | |
|---|---|---|
| JP | 08-087655 A | 4/1996 |
| WO | WO 97/45814 A1 | 12/1997 |
| WO | WO 99/51038 | 7/1999 |
| WO | WO 00/03328 | 1/2000 |
| WO | 01/71627 A2 | 9/2001 |

OTHER PUBLICATIONS

Abrazhevich, Dennis; "Classification and Characteristics of Electronic Payment Systmes"; 2001, *LNCS*, vol. 2115, pp. 81-90.

Anderson, Ross et al.; "NetCard—A Practical Electronic Cash System"; *Computer Laboratory, Pembroke Street*, Cambridge, 9 pages.

Arun B. Salvi et al., "Dial M for Money", Proceedings of the 2nd International Workshop on Mobile Commerce (WMC '02) in Atlanta, GA, Sep. 28, 2002, pp. 95-99, ACM (2002).

Asokan, N.; "Fairness in Electronic Commerce"; 1998, *University of Waterloo Thesis*, 163 pages.

Balan, Rajesh et al.; "The Case for Cyber Foraging"; *School of Computer Science, Carnegie Mellon University*, 6 pages.

Belaramani, Nalini Moti et al.; "A Component-based Software Architecture for Pervasive Computing"; *Department of Computer Science and Information Systems, University of Hong Kong*, 20 pages.

Cox, Benjamin et al.; "NetBill Security and Transaction Protocol"; *School of Computer Science, Carnegie Mellon University*, 12 pages.

Dusparic, Ivana et al.; "Mobile Software Licensing"; 2003, 11 pages.

Hauser, Ralf et al.; "Research Report: Micro-Payments based on iKP"; 1996, *IBM Research Division*, 10 pages.

Iftode, Liviu et al.; "Smart Phone: An Embedded System for Universal Interactions"; *Department of Computer Science, Rutgers University*, 7 pages.

Janson, P. et al.; Electronic Payment Systems, 1996, *Semper Activity Paper*, 25 pages.

Jerrygao et al., "P2P-Paid: A Peer-to-Peer Wireless Payment System", Proceedings of 2005 Second IEEE International Workshop on Mobile Commerce and Services (WMCS'05) in Munich, Germany, Jul. 19, 2005, pp. 1-10, IEEE Computer Society (2005).

Jiajun J. Chen et al., "Short-range Wireless Technologies with Mobile Payments Systems", Sixth International Conference on Electronic Commerce (ICEC'04), pp. 651-656, ACM (2004).

Knospe, Heiko et al.; "Online Payment for Access to Hetrogeneous Mobile Networks"; *Information Security Group, Royal Holloway, University of London*, 5 pages.

(56) References Cited

OTHER PUBLICATIONS

Pfitzmann, Birgit; "Research Report: Properties of Payment Systems: General Definition Sketch and Classification"; 1996, *IBM Research Division*, 29 pages.
Poslad, Stefan et al.; "Crumpet: Creation of User-Friendly Mobile Services Personalised for Tourism"; *University of London*, 5 pages.
Ramfos, A. et al.; "Semops: Paying with Mobile Personal Devices"; 2004, *Fourth IFIP Conference on e-Commerce, e-Business and e-Government*, 16 pages.
Ravi, Nishkam et al.; "Split Smart Messages: Middleware for Pervasive Computing on Smart Phones"; *Department of Computer Science, Rutgers University*, 10 pages.
Soderkvist, Jonas; "Evaluation of Wireless Techniques for Short-Range Communication"; 2003, Master's Thesis, performed in Data Transmission, Department of Electrical Engineering, at Linkopings University, pp. 1-95.
Steve Glassman et al., The Millicent Protocol for Inexpensive Electronic Commerce. *The Millicent Protocol for Inexpensive Electronic Commerce* [online] pp. 1-16, URL: http://www.w3.org/Conferences/WWW4/Papers/246/ [Accessed Jan. 22, 2008].
Stig F. Mjølsnes et al., "Localized Credentials for Server Assisted Mobile Wallet", 2001 International Conference on Computer Networks and Mobile Computing (ICCNMC'01), pp. 203-208, IEEE Computer Society Press, (2001).
Tygar, J.D.; "Atomicity in Electronic Commerce"; *School of Computer Science, Carnegie Mellon University*, 19 pages.
Non-Final Office Action mailed Jul. 24, 2013 for U.S. Appl. No. 12/263,254, 22 pages.
Canadian Office Action dated Oct. 18, 2012 in CA Application No. 2,595,176.
Office Action mailed Aug. 28, 2012 in U.S. Appl. No. 13/462,745, filed May 2, 2012.
Office Action mailed Feb. 27, 2014 in Canadian Patent Application No. 2,595,176, 3 pages.
"Paying by text, down to a tea," Sunday Business Post, Oct. 31, 2002, Cork, Ireland, 2 pages.
Non-Final Office Action mailed May 26, 2006 in U.S. Appl. No. 11/040,640, 7 pages.
International Search Report and Written Opinion of the International Searching Authority for Int'l Patent Application No. PCT/US2006/002049 mailed on Jun. 22, 2006, 5 pages.
Non-Final Office Action mailed Sep. 25, 2007 in U.S. Appl. No. 11/519,276, 7 pages.
Supplementary European Search Report mailed Jun. 16, 2009 in European Patent Application No. 06719027.2, 7 pages.
Non-Final Office Action mailed Aug. 6, 2009 in U.S. Appl. No. 12/263,254, 12 pages.
Final Office Action mailed Feb. 18, 2010 in U.S. Appl. No. 12/263,254, 12 pages.
Non-Final Office Action mailed Nov. 19, 2010 in U.S. Appl. No. 11/928,700, 9 pages.
Non-Final Office Action mailed Jul. 26, 2011 in U.S. Appl. No. 12/263,298, 9 pages.
Final Office Action mailed Dec. 19, 2011 in U.S. Appl. No. 12/263,298, 8 pages.
Non-Final Office Action mailed Dec. 30, 2011 in U.S. Appl. No. 12/263,254, 11 pages.
Final Office Action mailed Jul. 18, 2012 in U.S. Appl. No. 12/263,254, 15 pages.
Non-Final Office Action mailed Mar. 20, 2013 in U.S. Appl. No. 13/462,745, 8 pages.
Final Office Action mailed Mar. 12, 2014 in U.S. Appl. No. 12/263,254, 20 pages.
Anderson, Ross et al.; "NetCard—A Practical Electronic Cash System"; *Computer Laboratory, Pembroke Street*, Cambridge, 1996, 9 pages.
Balan, Rajesh et al.; "The Case for Cyber Foraging"; *School of Computer Science, Carnegie Mellon University*, 2002, 6 pages.
Belaramani, Nalini Moti et al.; "A Component-based Software Architecture for Pervasive Computing", *Department of Computer Science and Information Systems, University of Hong Kong*, 2004, 20 pages.
Cox, Benjamin et al.; "NetBill Security and Transaction Protocol"; *School of Computer Science, Carnegie Mellon University*, 1995, 12 pages.
Iftode, Liviu et al.; "Smart Phone: An Embedded System for Universal Interactions"; *Department of Computer Science, Rutgers University*, 2004, 7 pages.
Knospe, Heiko et al.; "Online Payment for Access to Hetrogeneous Mobile Networks"; *Information Security Group, Royal Holloway, University of London*, 2002, 5 pages.
Poslad, Stefan et al.; "Crumpet: Creation of User-Friendly Mobile Services Personalised for Tourism"; *University of London*, 2001, 5 pages.
Ravi, Nishkam et al.; "Split Smart Messages: Middleware for Pervasive Computing on Smart Phones"; *Department of Computer Science, Rutgers University*, 2004, 10 pages.
Tygar, J.D.; "Atomicity in Electronic Commerce"; *School of Computer Science, Carnegie Mellon University*, 1996, 19 pages.
Non-Final Office Action mailed Sep. 26, 2014 in U.S. Appl. No. 12/263,254, 5 pages.

\* cited by examiner

WIRELESS PAYMENT METHOD AND SYSTEMS

CROSS-REFERENCES TO RELATED APPLICATIONS

This application is a continuation of U.S. patent application Ser. No. 11/877,880 filed on Oct. 24, 2007, which is a continuation of U.S. patent application Ser. No. 11/519,276, filed Sep. 11, 2006, which is a continuation application of U.S. patent application Ser. No. 11/040,640, filed Jan. 21, 2005, which are herein incorporated by reference in their entirety for all purposes.

BACKGROUND OF THE INVENTION

A number of payment solutions exist. Existing payment solutions include smart cards. A smart card is typically a credit card-sized plastic card that includes an integrated circuit chip. The smart card interfaces with a card reader at a point-of-sale terminal at a merchant. The card reader interface on the card can include contacts, which can contact contacts on the card reader. During operation, signals from the integrated circuit are routed to the contacts on the card which come into physical contact with similar contacts in the card reader device so that the smart card can communicate with the outside world.

While smart cards are desirable, a number of improvements could be made. For example, existing smart card payment applications do not allow a payer to choose an exact source account for providing the payment and do not allow a payee to choose an exact target account for receiving the payment. They also do not allow payers and payees who might not have traditional card reader hardware to conduct financial transactions. For example, one family member may owe a debt to another family member. This transaction would be limited to either a cash or check-type transaction, since the family members would not operate card reader devices like those operated by merchants.

Also, when using a smart card, a payer may initiate a request for payment at a card reader at a point of sale. The card reader then communicates with a remotely located server computer, which approves of the transaction and facilitates subsequent processing to conclude the transaction. Since the initial request for payment and the subsequent acceptance of the initial request for payment require a server computer, a payer and a payee that do not have immediate access to a server computer may not be able to conduct the transaction at any time and at any location. For example, the payer and the payee may be at a location which does not provide for easy access to any computer network, let alone a particular payment server computer.

Embodiments of the invention address the above-noted problems, and other problems, individually and collectively.

SUMMARY OF THE INVENTION

Embodiments of the invention are directed to methods, systems, computer readable media, and portable electronic devices that are useful for conducting transactions.

One embodiment of the invention is directed to a method for conducting a transaction comprising: using a first portable electronic device, directly transmitting a request for payment to a second portable electronic device through a wireless link; receiving approval of the request for payment at the first portable electronic device, wherein the approval is sent directly from the second portable electronic device to the first portable electronic device through the wireless link; and then sending the request for payment to a payment hub service.

Another embodiment of the invention is directed to a method of facilitating a transaction comprising: receiving an approval of a request for payment at a server computer at a payment hub service, wherein the approval of the request for payment was obtained after a first portable electronic device directly transmitted a request for payment to a second portable electronic device through a wireless link, and after the approval of the request was received at the first portable electronic device, wherein the approval was sent directly from the second portable electronic device to the first portable electronic device through the wireless link; and then facilitating payment from a payer's account to a payee's account.

Other embodiments of the invention are directed to computer readable media comprising code for performing the above-noted methods.

Other embodiments of the invention are directed to portable electronic devices and server computers.

Embodiments of the invention have a number of advantages. Embodiments of the invention can be used to conduct financial transactions using an existing payments infrastructure and using the computing capabilities in common handheld wireless devices like cell phones or personal digital assistants. Embodiments of the invention can also support the sending and receiving of payments between dissimilar payment methods and services. Payment requests can be submitted to a trusted intermediary capable of brokering between dissimilar payer and payee payment methods. Embodiments of the invention also can also allow payers and payees to specify the exact source and target financial accounts and institutions to be used in conducting a transaction, and can also establish trust between parties.

These and other embodiments of the invention are described below with reference to the Figures and the Detailed Description.

DETAILED DESCRIPTION

Figure 1:
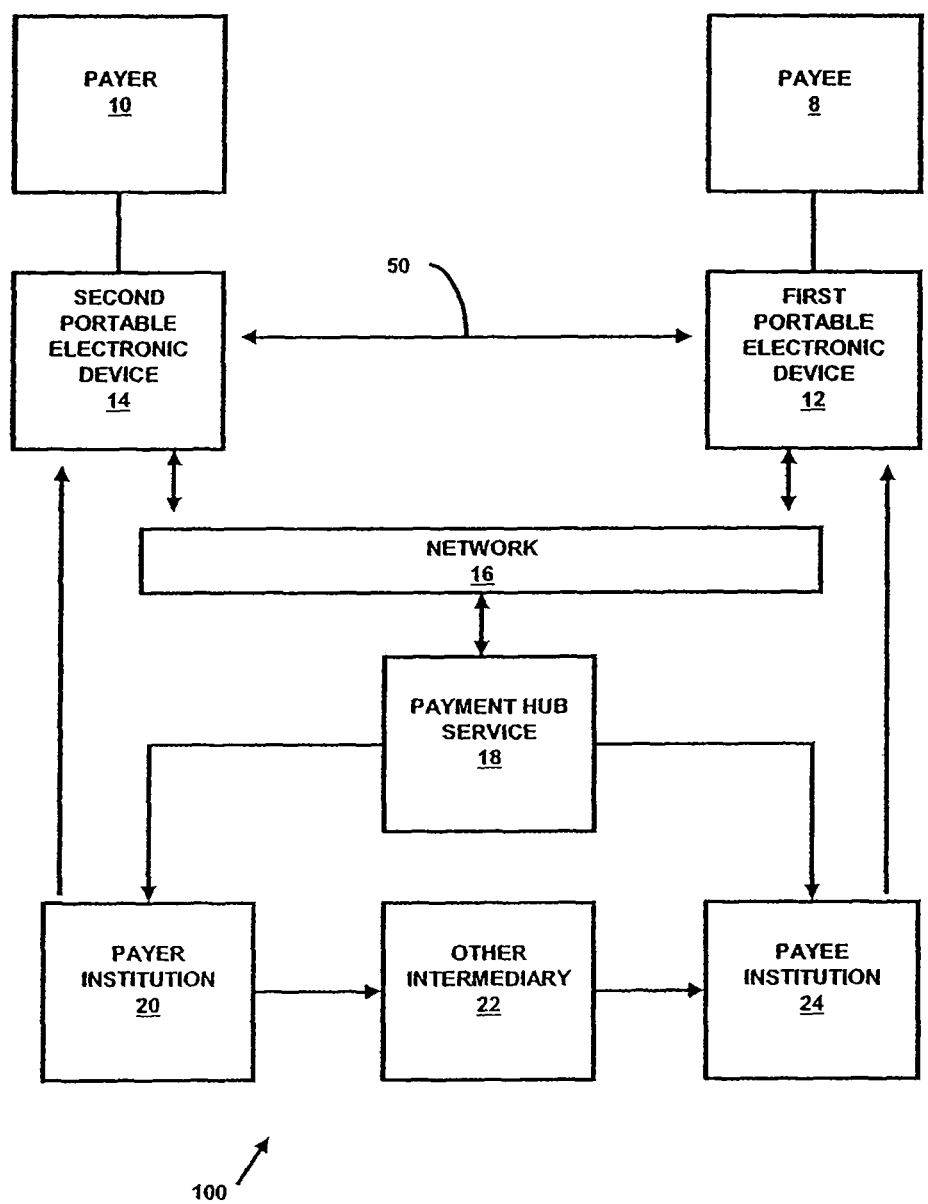
FIG. 1 shows a system according to an embodiment of the invention.

Embodiments of the invention include transactions between two or more parties (e.g., a payer, a payee, etc.) using portable electronic devices that communicate through one or more wireless links. The parties' portable electronic devices communicate with each other directly through the one or more wireless links, rather than indirectly through a payment application located in a third device or computer such as a server computer.

In one exemplary illustration of an embodiment of the invention, either the payee or payer directly transmits a request for payment from a first portable electronic device to a second portable electronic device operated by the opposite party to the transaction, i.e., if the payer initiates the request, it is received by the payee, and if the payee initiates the request, it is received by the payer. The transmission of the request for payment occurs through a wireless link that provides for a direct communication channel between the first portable electronic device and the second portable electronic device. The second portable electronic device then receives the request for payment. After receiving the request for payment, the party operating the second portable electronic device transmits an approval of the request for payment to the first portable electronic device through the wireless link.

After the request for acceptance has been initiated and accepted, the request for payment is sent to a payment hub service. Providers of the payment hub service may include entities such as banks or credit card processors. The payment hub service may be remotely located with respect to the portable electronic devices and facilitates the transfer of funds from a payer institution such as a payer bank to a payee institution such as a payee bank. The request for payment may be transmitted to the payment hub service by either the first portable electronic device or the second portable electronic device. Further details regarding preferred embodiments of the invention are provided below.

The various parties that participate in the transaction may have different roles. For example, the roles may include a "payer", a "payee", a "transmitter", an "initiator", and a "recipient". A single person or organization may have more than one role. For example, a payer can also be a transmitter and an initiator in some embodiments.

As used herein, the "payer" is the party that pays value in a transaction. The "payee" is the party that receives value in the transaction. The "transmitter" is the party that communicates the request for payment to the payment hub service. Either the payer or the payee may be the transmitter. The transmitter may have a relationship with the payment hub service.

The "initiator" of the request for payment in the transaction is the party whose portable electronic device (or application residing in the portable electronic device) will begin the transaction by initiating the request for payment. Either the payer or payee may initiate the request. The "recipient" of the request for payment is the party whose portable electronic device (or application residing in the portable electronic device) will receive the initial request for payment. Either the payer or payee may receive the request.

Embodiments of the invention provide for a number of advantages. First, embodiments of the invention can be used for a wide variety of payments between individuals, partnerships or corporations in place of cash or personal checks. For example, embodiments of the invention can be used for traditional purchases from established merchants; or other payments to individuals or groups where cash or checks are most common today. Second, embodiments of the invention also provide the payer with the convenience of paying in an auditable, secure manner. They can decrease risk of loss through theft, and can provide a record of payment date, amount and payee. They can also provide the payee with the security of payments facilitated by trusted institutions, thereby providing for reduced repudiation risk, faster funds availability, and decreased risk of loss through theft.

Embodiments of the invention can be used in any suitable environment including traditional and non-traditional payment settings. For example, they can be used to support payments to traditional bricks-and-mortar and Internet vendors. They can also be used in different ways including, but not limited to: casual purchasing at events such as garage sales; transferring money to a child attending college; repaying personal debts; paying child support; and paying domestic employees such as nannies and gardeners.

Specific embodiments of the invention can be described with reference to FIGS. 1-3.

FIG. 1 shows a system 100 which includes a first portable electronic device 12 and a second portable electronic device 14. The first portable electronic device 12 may be operated by a payee while the second portable electronic device 14 may be operated by a payer. Two portable electronic devices 12, 14 are shown for simplicity of illustration. However, it is understood that embodiments of the invention may use more than two portable electronic devices in other embodiments of the invention.

The portable electronic devices 12, 14 may have any suitable characteristics, and may be the same or different. For example, the portable electronic devices may be selected from the group consisting of portable computers, hand-held mobile phones (e.g., cell phones), personal digital assistants, etc., or devices that combine characteristics of these examples. Both portable electronic devices 12, 14 are capable of short range (e.g., line of sight) wireless communication.

In embodiments of the invention, the portable electronic devices 12, 14 may contain digital certificates and cryptogram capabilities that support two-factor authentication and transmission encryption. Security can be established between the portable electronic devices 12, 14, and between at least one of the portable electronic devices 12, 14 and the payment hub service 18. As explained below, software applications residing in the portable electronic devices 12, 14 can provide the desired security. Further details regarding the portable electronic devices 12, 14 are provided below.

The first and second portable electronic devices 12, 14 can communicate though a wireless link 50. The wireless link 50 provides a short range communication channel for the first and second portable electronic devices 12, 14. It may be based on known technologies including infrared, Wi-Fi, and Bluetooth technologies. See "Evaluation of Wireless Techniques for Short Range Communication" by Jonas Soderkuist.

Providing for direct wireless communication between the first and second portable electronic devices 12, 14 without an intermediary server computer provides a number of advantages. Because an intermediate server computer is not needed for initial communication between the payer and the payee, embodiments of the invention are more likely to be adopted by more users. First, known servers that act as intermediaries to payers and payees are typically tied to only one type of payment processing system. This limits the number of potential users. For example, if a server computer is operated by the well known company PayPal™, then both the payee and the payer must be affiliated with PayPal™. The payer cannot, for example, transfer finds from the payer's PayPal™ account to the payee's mutual fund account. However, in embodiments of the invention, since initial communication between the payer and the payee does not require a server computer that is tied to only one type of payment processing system, different source and target accounts can be provided by the payer and the payee to conduct the desired transaction. As explained in detail below, the hub service provider 18 may subsequently facilitate the task of transferring the appropriate funds from the selected source account to the selected target account, after the request for payment has been presented to the payee and accepted by the payee. Second, since the payer and the payee do not rely on an intermediary server computer for initial communication, the payer and payee could, but need not have immediate access to a server computer to conduct the transaction. This allows the payer and the payee to conduct the transaction in more places than would be possible if an intermediary server computer was used.

The first and second portable electronic devices 12, 14 may communicate with a network 16. The network 16 may comprise any suitable wired and/or wireless communication medium. For example, the network 16 may include the Internet.

A payment hub service 18 is in communication with the network 16. At least one of the portable electronic devices 12, 14 is capable of long-range communication, using for example, WiFi, Internet or mobile voice telephone capability, so that communication with the hub service 18 is possible.

The payment hub service 18 may include a server computer. A server computer is typically a powerful computer or cluster of computers. For example, the server computer may be a large mainframe, a minicomputer cluster, or a group of servers functioning as a unit. In one example, the server computer may be a database server coupled to a web server. Moreover, the server computer can behave as a single computer, which services the requests of one or more client computers or portable electronic devices.

The server computer at the payment hub service 18 may include a computer readable medium that may be embodied by one or more data storage devices using any suitable mechanism for data storage. The computer readable medium may have computer code for performing any of the functions of the payment hub service 18. For example, the computer readable medium may comprise code for receiving an approval of a request for payment at a server computer at a payment hub service, where the approval of the request for payment was obtained after a first portable electronic device directly transmitted a request for payment to a second portable electronic device through a wireless link, and after the approval of the request was received at the first portable electronic device, where the approval was sent directly from the second portable electronic device to the first portable electronic device through the wireless link. The computer readable medium may also comprise code for facilitating payment from a payer institution to a payee institution.

At least one of the portable electronic devices 12, 14 can communicate with the remotely located payment hub service 18. The payment hub service 18 communicates with a payer institution 20 such as a payer bank and a payee institution 24 such a payee bank. An optional intermediary 22 may be in communication with the payer institution 20 and the payee institution 24 to help facilitate the transaction. The intermediary 22 could be a credit card processing organization, an ACH (automated clearing house), etc. More than one intermediary 22 may participate in facilitating the transaction. Also, although separate payer and payee institutions are shown, a single payment institution may be used in other embodiments. For example, the payer and the payee may have accounts at the same bank.

Figure 2:
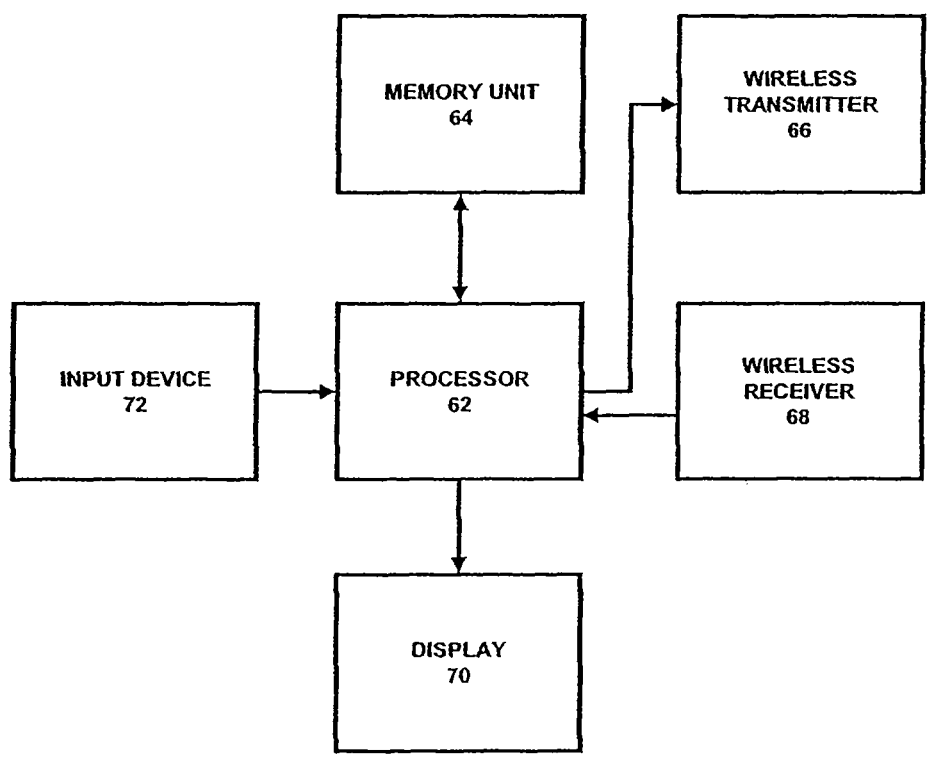
FIG. 2 shows a block diagram showing some components of a portable electronic device according to an embodiment of the invention.
Figure 3:
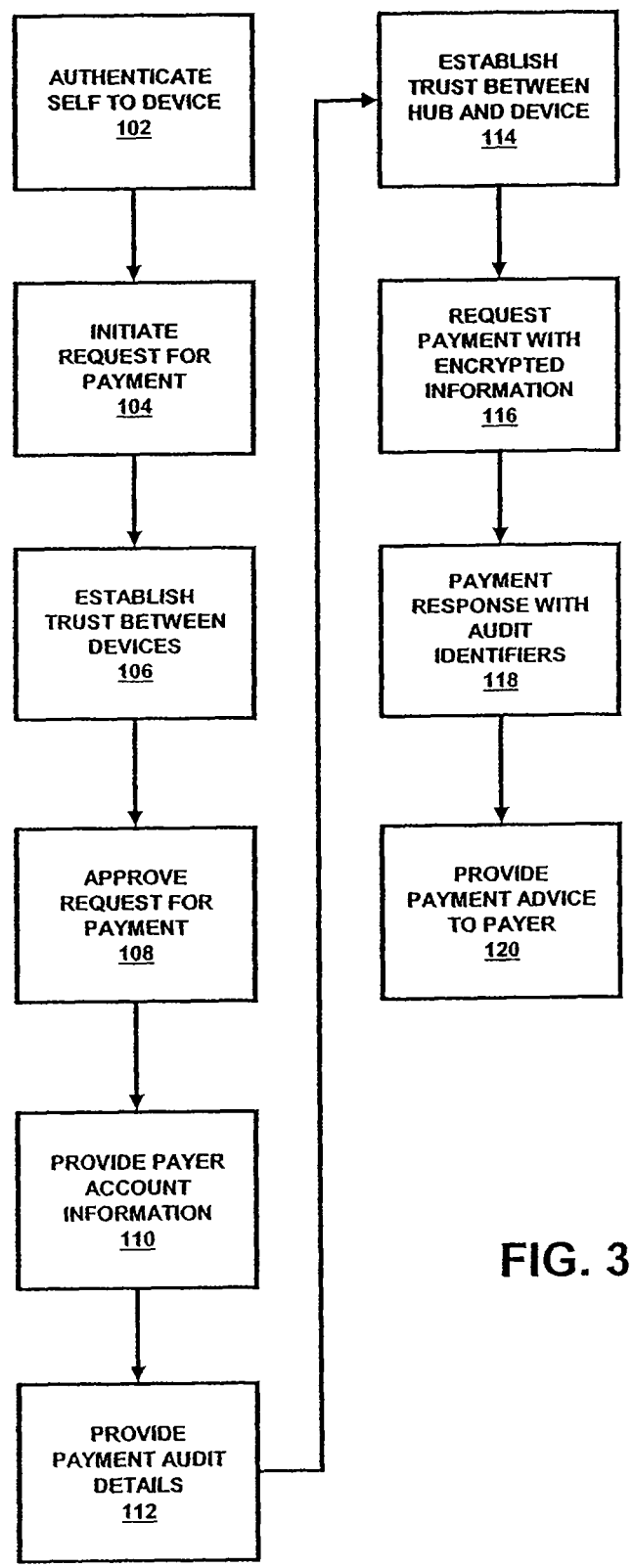
FIG. 3 shows a flowchart illustrating steps in a method according to an embodiment of the invention.

FIG. 2 shows a block diagram of some components of a portable electronic device according to an embodiment of the invention. The portable electronic device may include a processor 62 (e.g., a microprocessor) operatively coupled to a memory unit 64 comprising a computer readable medium, one or more input devices 72, a display 70, a wireless transmitter 66, and a wireless receiver 68. The memory unit 64 may comprise one or more memory devices working in association with each other or separately.

The one or more input devices 72 may include a keyboard, a touch sensitive pad, a voice-recognition system, etc. The display 70 may be an LCD (liquid crystal display), LED (light emitting diodes), or any other suitable display. The display 70 allows the payer and the payee to select the appropriate target and source accounts for their funds transfer. An optional audio output device such as a speaker or earphone jack could also be included.

The computer readable medium in the memory unit 64 may comprise or use any suitable electrical, magnetic, or optical mechanism for storing computer readable data. For example, the computer readable medium may comprise one or more of an optical disk, memory chips (e.g., RAM chip, ROM chip, EEPROM chip), etc.

Any of the functions performed by the portable electronic device may be stored as computer code. For example, the computer readable medium may comprise code for directly transmitting a request for payment from a first portable electronic device to a second portable electronic device through a wireless link, code for receiving approval of the request for payment, wherein the approval is sent directly from the second portable electronic device to the first portable electronic device through the wireless link, and code for sending the request for payment to a payment hub service which facilitates the transfer of funds from a payer institution to a payee institution. The computer readable medium may also comprise code for allowing the payer to select one or more source accounts and for allowing a payee to select one or more target accounts for use in the transaction between the payer and the payee. Examples of target and source accounts may include bank accounts, mutual fund accounts, credit card accounts, etc. Lastly, any of the functions may be programmed as computer code by those of ordinary skill in the art using any suitable programming language including C, C++, etc.

The wireless transmitter 66 and wireless receiver 68 may transmit or receive signals from other wireless transmitters and wireless receivers through a wireless link. They may receive and transmit wireless signals such as optical signals, IR signals, RF signals, etc. Suitable wireless transmitters and receivers are commercially available and need not be described in detail herein.

Preferred methods according to embodiments of the invention can be described with reference to both FIGS. 1 and 3.

A payee 8 and the payer 10 first authenticate themselves to their respective portable electronic devices 12, 14 (step 102). Software applications in the first and second portable electronic devices 12, 14 are initiated and "unlocked" by the payee 8 and the payer 10 before the payment by the payer 10 can be enabled. For example, to unlock the software application in the first portable electronic device 12, the payee 8 provides a secure password to the portable electronic device 12.

In embodiments of the invention, until the software application on a portable electronic device is unlocked by the appropriate party, no other function is permitted. After a specified number of unsuccessful attempts to unlock the software application have occurred, the software application can be disabled and cannot be used until the application service provider resets the device. This process may be reused during other steps of the payment process to ensure security.

As an additional security measure, in some embodiments, neither the payer nor the payee can view the other's payment account information. Account information can be encrypted in the application and may not be stored in the portable electronic device after the transaction ends.

The software applications residing on the first and second portable electronic devices 12, 14 may be payment method neutral. In other words, the first and second portable electronic devices may not require the payer and the payee to use a particular payment method. For example, although in some embodiments, the software applications in the portable electronic devices 12, 14 may be generalized to support dissimilar payer and payee payment methods. In other embodiments, the portable electronic devices 12, 14 may work in concert with a single service provider such as Visa®.

Before the transfer of funds takes place, the payer 10 and payee 8 agree on the manner in which information is exchanged between their portable electronic devices 12, 14 though a wireless communication link 50. The communication link 50 may use, for example, WiFi or infrared technology.

After the payer 10 and the payee 8 agree on the manner in which information is exchanged, the payee 8 uses the first portable electronic device 14 to initiate a request for payment (step 104). The request for payment may include role information, the amount of the payment, and the currency being used. Although the payee 8 initiates the payment request in this example, it is understood that in other embodiments, the payer 10 can alternatively begin the payment process by selecting a "request for payment" in the software application that resides in the payer's portable electronic device 12, 14. In this alternative embodiment, the second portable electronic device 14 would initiate the request for payment.

After the payee initiates the request for payment, trust is established between the first and second portable electronic devices 12, 14 (step 106). Put another way, security is established between the portable electronic devices 12, 14 before the payment process can proceed. Each portable electronic device 12, 14 can establish the identity of the other portable electronic device for checking in all subsequent data transmissions. For example, the first portable electronic device 12 establishes a secure connection to the second portable electronic device 14 for checking in all subsequent data transmissions. Establishment of identity is performed using credentials present within the software applications in the first and second portable electronic devices 12, 14, without need for both the first and second portable electronic devices 12, 14 to authenticate to an intermediary such as an intermediary server computer.

Then, the request for payment is approved by the payer 10 (step 108). The payer's second portable electronic device 14 receives the request for payment data, and reviews it for acceptability. If the request is acceptable, the payer 10 indicates approval of the requested payment amount and indicates the payer's role in the transaction using the software application residing on the payer's second portable electronic device 14. The payer 10 then uses the second portable electronic device 14 to transmit the approval of the request for payment to the payee 8. If the request for payment is not acceptable, then the payer 10 denies the request and the denial is transmitted to the payee 8. If the payment request is acceptable, the payer 10 and payee 8 choose a payment method before the proceeding to the next step in the process. Any suitable type of payment method may be used. For example, the payer 10 may pay the payee 8 using a credit account, a debit account, etc.

Then, payer 10 account information is provided to the payee 8 (step 110). In this step, the software application residing, for example, on the first portable electronic device 14 collects information from several sources to create a set of data records that will be used with a payment hub service 18 to facilitate the payment. Several data exchanges between first and second portable electronic devices 12, 14 may be required to bring all of the data to the device that will act as the transmitter. In this instance, the transmitter may be the first portable electronic device 14 and the payer 10. The exact data exchange process is determined by the roles being played by the payee 8, payer 10, and the first and second portable electronic devices 12, 14. The software applications residing on the first and second portable electronic devices 12, 14 ensure that they are in constant contact during the transaction process.

The payment hub service 18 can act as a broker between different payment methods (e.g., credit, debit, and stored value). The payer 10 and payee 8 do not have to use the same payment method to accomplish the transfer. For example, the payer 10 may specify that the source of the funds (including account tokens if necessary) will come from the payer's debit card account. The payee 8 may specify that the target account for the funds will be the payee's credit account. If the payee 8 and/or the payer 10 do not want to use their actual financial accounts, proxy accounts may be used by the payee 8 and/or the payer 10.

Then, the second portable electronic device 14 provides payment audit details to the first portable electronic device 12 (step 112). At the beginning of this step, the payer 8 and the payee 10 confirm the details of the payment again. The software application residing in the second portable electronic device 14 creates an audit record and transmits it to the first portable electronic device 12. This provides a record indicating that a request for payment and approval thereof has occurred between the two portable electronic devices 12, 14. The audit record contains a tracking number that will be used in subsequent payment hub service processing to ensure integrity and audit ability. Each software application in each portable electronic device 12, 14 records the tracking number and payment date, time and amount for subsequent display and reconciliation.

Trust is then established between the payment hub service 18 and the second portable electronic device 14 (step 114). The second portable electronic device 14 may communicate with the payment hub service 18 through a network 16. In some embodiments, both portable electronic devices transmit the request for payment to the payment hub service 18. The transmission may occur shortly after the request for payment has been accepted, or may occur sometime after it has been accepted. Either the payer 10 or payee 8 can transmit the request to the payment hub service 18. In this step, the transmitter (which may be the payer 10 or the payee 8) and the payment hub service 18 establish the security needed for the transmission of payment request data to the payment hub service 18. Establishment of identity will be performed using credentials held within the software application residing in the transmitting portable electronic device and the payment hub service 18, without need for both parties to authenticate to an intermediary. The payment hub service 18 and the second portable electronic device 14 will be able to establish the identity of each other for checking in all subsequent data transmissions.

Then, a request payment transaction is performed (step 116). In this step, payment request data is transmitted from the transmitter device to the payment hub service, using the secure network connection and credentials established in the previous step. For example, in FIG. 1, the second portable electronic device 14 may transmit the payment request data to the payment hub service 18. The software application in the second portable electronic device 14 provides a standard set of information needed to complete the transfer, including amount, source account, destination account, tracking number and other information required by the payment hub service 18. The payment hub service 18 evaluates the payment request for acceptability, and communicates the results of the transfer to both the payer 10 and the payee 8.

Then, a payment transaction audit trail is provided (step 118). The payment hub service 18 provides advice records to the payer 10 and payee 8 account providers for audit and tracking purposes. The advice records may be used for many purposes, including, but not limited to financial reconciliation, risk management, and transaction research.

After the payment hub service 18 receives the request for payment, the payment hub service 18 transmits advice notification to the payer 10 and the second portable electronic device 14 (step 122). In some embodiments, the payment hub service 18 retains payment transaction records for audit and research. Tracking information supplied by a software application residing on at least one of the portable electronic devices can provide a key for locating audit records.

The payment hub service 18 can also facilitate the transfer of funds from a payer institution 20 such as a payer bank to the payee institution 24 such a payee bank by contacting one or more of these institutions. An intermediary 22 such as a credit card organization, an ACH (automated clearing house), etc. may facilitate the transfer of funds from the payer institution 20 to the payee institution 24.

Embodiments of the invention are not limited to those embodiments specifically described with reference to FIGS. 1 and 3. For example, in some embodiments, the payment hub service 18 could contain both payer and payee accounts and any transfer of funds can take place solely within the payment hub service 18 without the need for a separate payer institution 20, intermediary 22, and/or payee institution 24.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

Also, it should be understood that the present invention as described above can be implemented in the form of control logic using computer software in a modular or integrated manner. Based on the disclosure and teachings provided herein a person of ordinary skill in the art will know and appreciate other ways and/or methods to implement the present invention using hardware and a combination of hardware and software.

All references, patent applications, and patents mentioned above are herein incorporated by reference in their entirety for all purposes. None of them are admitted to be prior art to the presently claimed inventions.

What is claimed is:

1. A method for conducting a transaction comprising:
   directly transmitting, by a first portable electronic device through a direct wireless link to a second portable electronic device, a request for payment to the second portable electronic device, the payment to be a part of the transaction between the first portable electronic device and the second portable electronic device;
   establishing trust between the first portable electronic device and the second portable electronic device, which includes establishing an identity of the first portable electronic device by the second portable electronic device and establishing an identity of the second portable electronic device by the first portable electronic device;
   receiving, at the first portable electronic device through the direct wireless link from the second portable electronic device, an approval of the request for payment and payment details for review, the approval corresponding to a first confirmation that the transaction is to proceed;
   responsive to a second confirmation by both parties that the transaction as configured is to proceed, receiving, at the first portable electronic device through the direct wireless link, an audit record (i) including a tracking number for identifying the transaction among a plurality of transactions and (ii) corresponding to an indication that the transaction as requested and configured has been approved by both parties, the audit record and the tracking number generated and provided by the second portable electronic device;
   establishing trust between the first portable electronic device and a server computer, which includes establishing the identity of the first portable electronic device by the server computer and establishing an identity of the server computer by the first portable electronic device; and
   transmitting, by the first portable electronic device over a network to the server computer, payment request data indicating an instruction to transfer funds for the transaction, wherein the payment request data comprises the audit record including the tracking number,
   wherein the first portable electronic device and the second portable electronic device are phones capable of long range and short range communication,
   wherein the establishing of the identity of the first portable electronic device and the establishing of the identity of the second portable electronic device is performed using credentials present in the first portable electronic device and the second portable electronic device without a need for either the first portable electronic device or the second portable electronic device to authenticate to an intermediary,
   wherein the establishing of the identity of the first portable electronic device and the establishing of the identity of the server computer is performed using credentials present in the first portable electronic device and the server computer without a need for either the first portable electronic device or the server computer to authenticate to the intermediary, and
   wherein the audit record is utilizable to reduce repudiation risk based at least in part on the indication that the transaction as requested and configured has been approved by both parties.

2. The method of claim 1 wherein the direct wireless link comprises an infrared, RF, or optical link.

3. The method of claim 1, wherein the server computer is in a payment hub service.

4. The method of claim 1, wherein the server computer facilitates a transfer of the funds from a payer institution to a payee institution, and wherein the payer institution is a payer bank and the payee institution is a payee bank.

5. The method of claim 1 wherein the first portable electronic device comprises a digital certificate.

6. The method of claim 1, wherein the server computer is in a payment hub service, wherein the payment hub service acts as a broker between different payment methods comprising a first payment method type and a second payment method type.

7. The method of claim 6, wherein:
the payment request data sent to the server computer further comprises an identifier of the second payment method type selected by a first user of the first portable electronic device and an identifier of the first payment method type selected by a second user of the second portable electronic device;
wherein the first payment method type and the second payment method type are not the same; and
wherein the server computer, based upon the payment request data, facilitates the transfer of the funds from a payer institution of the second user to a payee institution of the first user.

8. The method of claim 1 wherein a first secure password is required before the request for payment is transmitted by the first portable electronic device.

9. The method of claim 1, further comprising receiving, by the first portable electronic device and from the second portable electronic device, a payer account identifier of a first account of a payer operating the second portable electronic device to be used as a source of funds for the transaction, wherein the payer account identifier is an encrypted account number and, and wherein the method further comprises erasing the encrypted account number such that the encrypted account number is not stored by the first portable electronic device after the transaction ends.

10. The method of claim 1 further comprising:
receiving, at the first portable electronic device from the second portable electronic device, a role of a person operating the second portable electronic device in the transaction, wherein the role is of a payer.

11. The method of claim 10 wherein the payment request data comprises a transfer amount, a source account, and a destination account.

12. The method of claim 11 further comprising:
receiving payment advice data for the transaction from the server computer.

13. A phone comprising:
a processor; and
a computer readable medium coupled with the processor, the computer readable medium comprising code that when executed with the processor causes the phone to perform operations comprising
directly transmitting a request for payment from the phone to a second portable electronic device through a direct wireless link, the payment to be a part of a transaction between the phone and the second portable electronic device,
establishing trust between the phone and the second portable electronic device, wherein establishing trust includes establishing an identity of the phone by the second portable electronic device and establishing an identity of the second portable electronic device by the phone, and wherein the establishing of the identity of the first portable electronic device and the establishing of the identity of the second portable electronic device is performed using credentials present in the first portable electronic device and the second portable electronic device without a need for either the first portable electronic device or the second portable electronic device to authenticate to an intermediary,
receiving, through the direct wireless link from the second portable electronic device, an approval of the request for payment and payment details for review, the approval corresponding to a first confirmation that the transaction is to proceed,
responsive to a second confirmation by both parties that the transaction as configured is to proceed, receiving, through the direct wireless link, an audit record (i) including a tracking number identifying the transaction among a plurality of transactions and (ii) corresponding to an indication that the transaction as requested and configured has been approved by both parties, the audit record and the tracking number generated and provided by the second portable electronic device,
establishing trust between the phone and a server computer, which includes establishing the identity of the phone by the server computer and establishing the identity of the server computer by the phone, and wherein the establishing of the identity of the first portable electronic device and the establishing of the identity of the server computer is performed using credentials present in the first portable electronic device and the server computer without a need for either the first portable electronic device or the server computer to authenticate to the intermediary, and
transmitting, over a network to the server computer, payment request data indicating an instruction to perform the payment for the transaction, wherein the payment request data comprises the audit record including the tracking number,
wherein the audit record is utilizable to reduce repudiation risk based at least in part on the indication that the transaction as requested and configured has been approved by both parties.

14. The phone of claim 13 wherein the computer readable medium comprises a digital certificate.

15. The phone of claim 13 wherein the direct wireless link comprises an IR link, an optical link, or an RF link.

16. The phone of claim 13, wherein the server computer is in a payment hub service that acts as a broker between different payment methods.

17. The phone of claim 13 wherein the operations further comprise:
receiving, from the second portable electronic device, a role of a person operating the second portable electronic device in the transaction, wherein the role is of a payer.

18. The phone of claim 17 wherein the payment request data comprises a transfer amount, a source account, and a destination account.

19. A non-transitory computer readable storage medium storing instructions which, when executed by one or more processors of a first portable electronic device, cause the first portable electronic device to perform operations comprising:
directly transmitting, through a direct wireless link to a second portable electronic device, a request for payment to the second portable electronic device, the payment to be a part of a transaction between the first portable electronic device and the second portable electronic device;
establishing trust between the first portable electronic device and the second portable electronic device, which includes establishing an identity of the first portable electronic device by the second portable electronic device and establishing an identity of the second portable electronic device by the first portable electronic device;
receiving, through the direct wireless link, an approval of the request for payment from the second portable electronic device and payment details for review, the approval corresponding to a first confirmation that the transaction is to proceed;

responsive to a second confirmation by both parties that the transaction as configured is to proceed, receiving, through the direct wireless link, an audit record (i) including a tracking number identifying the transaction among a plurality of transactions and (ii) corresponding to an indication that the transaction as requested and configured has been approved by both parties, the audit record and the tracking number generated and provided by the second portable electronic device;

transmitting, over a network to a server computer, payment request data indicating an instruction to transfer funds for the transaction, wherein the payment request data comprises the audit record including the tracking number; and prior to transmitting, establishing trust between the first portable electronic device and the server computer, which includes establishing the identity of the first portable electronic device by the server computer and establishing the identity of the server computer by the first portable electronic device, wherein the first portable electronic device and the second portable electronic device are phones capable of long range and short range communication, wherein the establishing of the identity of the first portable electronic device and the establishing of the identity of the second portable electronic device is performed using credentials present in the first portable electronic device and the second portable electronic device without a need for either the first portable electronic device or the second portable electronic device to authenticate to an intermediary, wherein the establishing of the identity of the first portable electronic device and the establishing of the identity of the server computer is performed using credentials present in the first portable electronic device and the server computer without a need for either the first portable electronic device or the server computer to authenticate to the intermediary, and wherein the audit record is utilizable to reduce repudiation risk based at least in part on the indication that the transaction as requested and configured has been approved by both parties.

* * * * *

UNITED STATES PATENT AND TRADEMARK OFFICE
CERTIFICATE OF CORRECTION

PATENT NO. : 9,760,882 B2
APPLICATION NO. : 12/263320
DATED : September 12, 2017
INVENTOR(S) : Joan Myers, Sara Garrison and Mark Carlson Page 1 of 1

It is certified that error appears in the above-identified patent and that said Letters Patent is hereby corrected as shown below:

In the Claims

Column 10, Claim 1, Line 14 delete "number for identifying" and insert -- number identifying --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*